United States Patent [19]

Hosken

[11] 4,316,651
[45] Feb. 23, 1982

[54] REFLECTOR ASSEMBLY WITH ENHANCED VISIBILITY

[76] Inventor: Donald H. Hosken, 20171 Cherry La., Saratoga, Calif. 95070

[21] Appl. No.: 17,940

[22] Filed: Mar. 6, 1979

[51] Int. Cl.³ ............................................. G02B 5/12
[52] U.S. Cl. ...................................... 350/99; 350/98; 350/103
[58] Field of Search ............................... 350/97–109; 2/115, 240, 259, 249, 260.1, 161 R, DIG. 8; 73/458; 116/244

[56] References Cited

U.S. PATENT DOCUMENTS

| | | | |
|---|---|---|---|
| 1,716,685 | 6/1929 | Coney | 350/109 |
| 2,158,902 | 5/1939 | Gray | 350/99 |
| 2,361,287 | 10/1944 | Gustin | 350/98 |
| 2,685,231 | 8/1954 | Onksen | 350/103 |
| 2,884,835 | 5/1959 | Rupert | 350/103 |
| 3,140,340 | 7/1964 | Weber | 350/103 |
| 4,073,453 | 2/1978 | Thomas | 350/99 |
| 4,204,746 | 5/1980 | Fisher | 350/99 |

Primary Examiner—R. A. Rosenberger
Attorney, Agent, or Firm—David A. Boone; Jon R. Stark

[57] ABSTRACT

Two planar bodies of reflective material are coupled together, one before the other, and in line with the line of vision from an intended observation point. The base reflective body is designed to be attached to an object, vehicle, or the like. The second reflective body is movably coupled to the base reflective body. Movement of the base reflective body induces relative movement of the two reflective bodies. A counter weight is attached to the second reflective body to increase this relative movement. Enhanced visibility is provided not only by the relative movement of the two reflective bodies, but also by dynamic prismatic action, i.e. the reflection by the base reflector of light transmitted through the top reflective body.

8 Claims, 7 Drawing Figures

REFLECTOR ASSEMBLY WITH ENHANCED VISIBILITY

BACKGROUND AND SUMMARY OF THE INVENTION

Various previous efforts have been made to insure visibility of people, vehicles, stationary objects, or the like, through the application of reflective materials or reflectors. Typically, reflectors have included a myriad of prismatic and reflective surfaces for reflecting light coming towards the reflective surface, e.g. from an approaching vehicle's headlights, back towards the operator of the approaching vehicle. The attention of the operator is attracted because the reflector appears brighter than the surrounding objects since it reflects more light than the surrounding objects. Typically, the reflection pattern also changes as the light source moves with respect to the reflective material.

One of the disadvantages of these prior art "reflectors" is the lack of attention-getting action other than through the changing reflection patterns which might occur through the relative movement of the light source and the reflector.

In accordance with the preferred embodiment of the present invention, enhanced visibility is provided by dual planes of reflective material comprising a myriad structure of prismatic and reflective surfaces. These dual planes of reflective material are coupled together so that each may move with respect to the other. One of the reflective bodies is used as the base and is intended to be affixed or coupled to the desired point. The second reflective plane is smaller than the first and designed to cover a portion of the base reflective plane. The two reflective bodies are coupled together in a non-rigid fashion so as to allow relative movement between them. The top reflective body permits the transmission of some light througn it which is then reflected by the base reflective body. This effect is referred to as dynamic prismatic action. The two reflective bodies are coupled together so that movement or impact that causes the base reflective body to move will cause the second reflective body to also move but in a different pattern. One or more counterweights may also be attached to the second reflective body to increase the relative movement. Visibility is further enhanced by utilizing different color reflective bodies for the two reflective bodies.

DESCRIPTION OF THE PREFERRED EMBODIMENT

Figure 1:
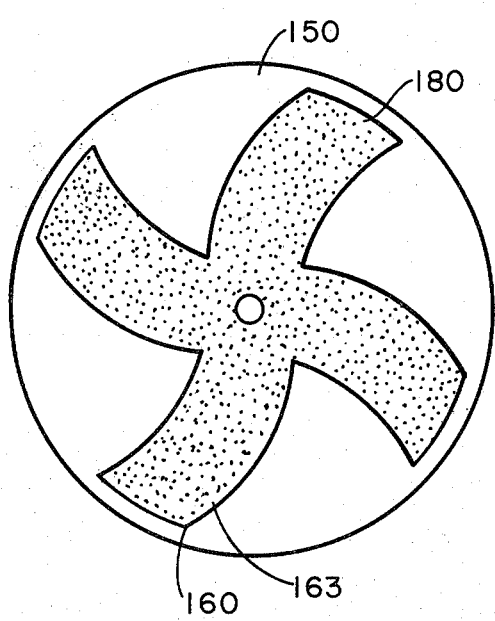
FIG. 1 is a top view of an embodiment of the present invention.
Figure 2:
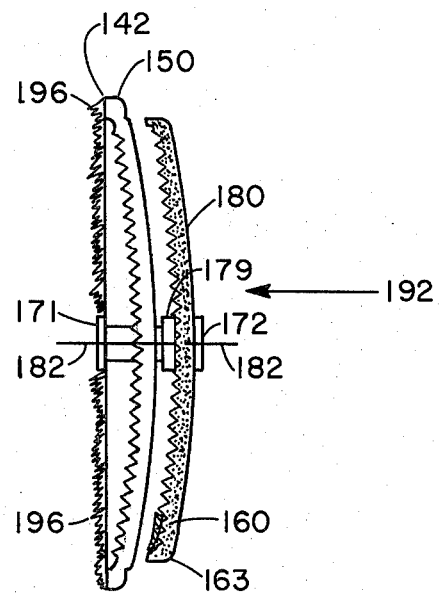
FIG. 2 is a side view of the embodiment of FIG. 1.

Referring now to FIGS. 1 and 2, there are shown front and side views of an embodiment of the present invention. A reflective body 150 is coupled to a rotor assembly 180 which comprises reflective material. The reflective material used to construct rotor 180 reflects some light falling on it from the direction shown by arrow 192 and also permits the transmission of some of this light onto reflector 150.

Reflectors 150 and 180 are coupled together through fasteners 171 and 172. Reflector 150 and 180 are held apart by a nylon spacer 179. Fasteners 171 and 172 permit the free rotation of reflective body 180, about the center line 182. A counterweight 160 is attached to one of the rotor arms 163 to enhance the relative movement of the reflective bodies 150 and 180.

The back wall 142 of reflector 150 comprises a mirrorlike coating to increase the reflection of light back through reflector 150. Both reflectors 150 and 180 comprise a myriad of prismatic structures having reflective and transmissive surface characteristics. This embodiment is intended to be affixed to the sweatshirt of a jogger and thus is provided with velcro attaching surface 196 on the rear wall of reflector 150.

Figure 3:
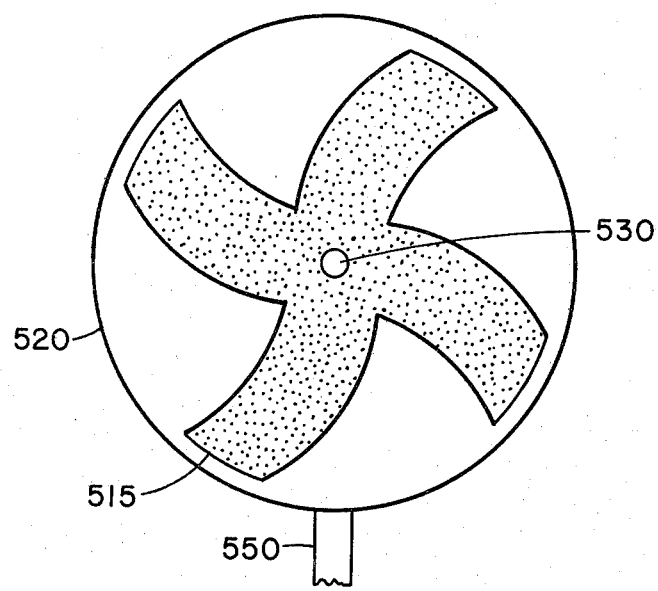
FIG. 3 is a front view of a second embodiment of the present invention.
Figure 4:
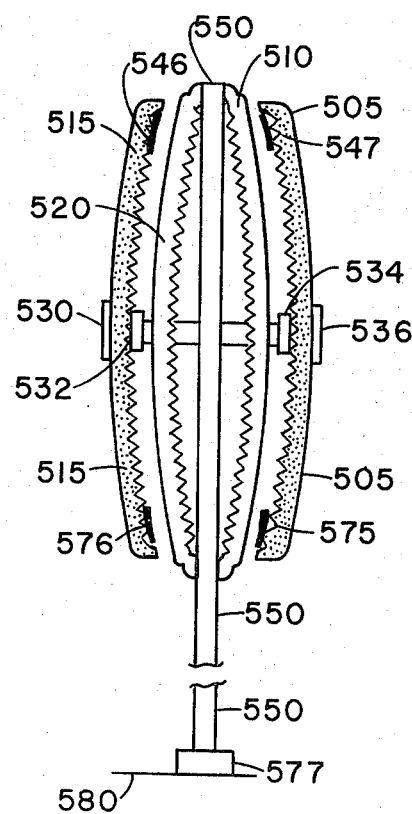
FIG. 4 is a side view of the embodiment of FIG. 3.

Referring now to FIGS. 3 and 4, there are shown front and side view respectively of a second embodiment of the present invention. This embodiment consists of dual reflector assemblies as described in FIG. 1 which are attached to a flexible wand 550. This assembly is designed to be used as an attachment to a bicycle or similar vehicle. Base reflectors 520 and 510 are firmly attached to flexible wand 550. Fastener 530 and 536 pass through and couple reflectors 515, 520 and 510 together. Nylon standoff washers 532 and 534 separate reflective bodies 515 and 520 and reflective bodies 510 and 505 respectively. Movement of the object 580 to which flexible wand 550 is attached through attachment base 577 will cause the wand to move back and forth. This will cause the movement of all the reflective bodies but in particular will cause the relative movement of reflectors 515 and 505 with respect to reflective bodies 502 and 510. Counterweights 576 and 575 are provided to increase this relative movement as shown in the embodiment to FIGS. 1 and 2. However, in this embodiment increased relative movement is provided through the providing of smaller counterweights 546 and 547 on the opposing blades of reflective assemblies 515 and 505 respectively. The providing of these additional counterweights increases the oscillation of reflective assemblies 515 and 505 because of the opposing forces presented. Additionally, visibility is enhanced not only through the rotational movement of reflectors 515 and 505, but also by the reflection of base reflectors 520 and 510 of light which is received after being transmitted through reflective bodies 515 and 505. Also, reflectors 520 and 515 are constructed from different color reflective material. These colors are chosen to create the maximum observability under the intended viewing conditions.

Figure 5:
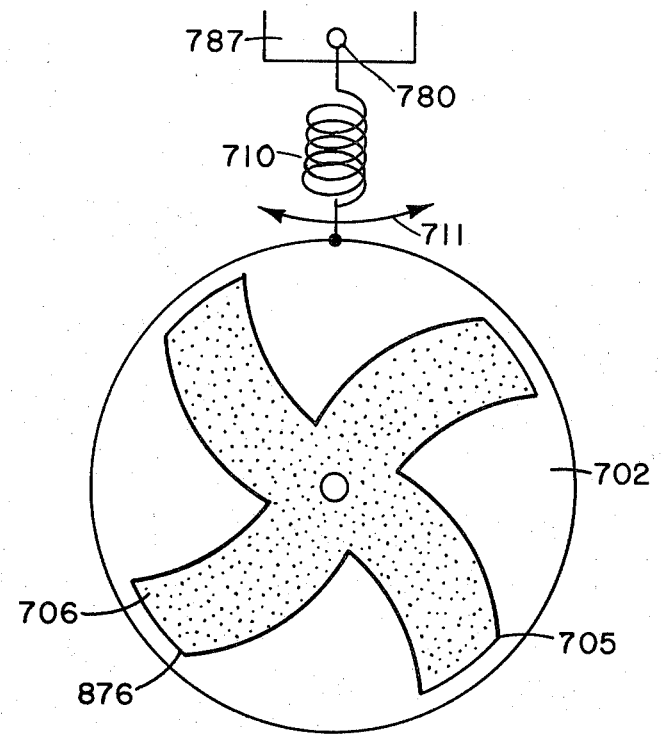
FIG. 5 is a third embodiment of the present invention.
Figure 6:
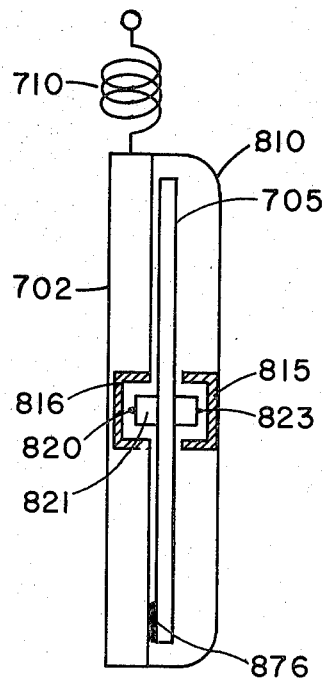
FIG. 6 is a side view of the embodiment of FIG. 5.

Referring now to FIGS. 5 and 6, there is shown a third embodiment of the present invention. As before, a base reflector 702 is positioned below reflective body 705. In addition, the base reflector is suspended from a point 780 through a spring 710 is used to couple base reflector 702 to the attachment point 780 on object 787. In this way, movement of object 787 will impart motion of reflector 702 and 705 in various directions, including side to side as shown by arrow 711. In this embodiment, the relative movement of reflector 705 and 702 due to the presence of a counterweight 876 positioned on arm 706 will be greatly increased.

Figure 7:
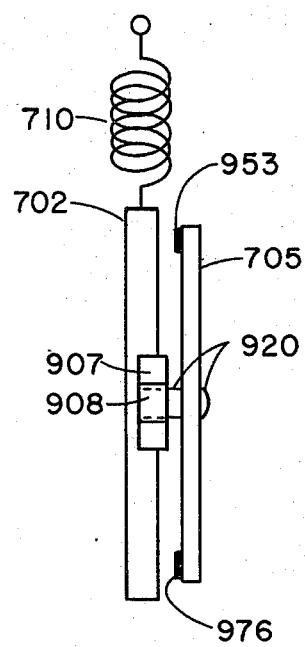
FIG. 7 is a side view showing an alternate construction for the embodiment of FIG. 5.

Two alternate embodiments for constructing the embodiment whose front view is shown in FIG. 5 are shown in FIGS. 6 and 7. In FIG. 6, an embodiment is shown in which the reflector structure may be hermetically sealed is desired. Base reflector 702 includes a teflon insert 816 which includes an indentation to receive shaft 820. Shaft 820 is a cylindrical structure with small cone shaped projections 821 and 823 at each end. Reflective body 705 is mounted on shaft 820 which passes through its center. An opposing mounting insert 815 is held in place by clear cover 810. Shaft 820 and inserts 816 and 815 are constructed from a material having a low coefficient of friction, such as nylon or teflon. Therefore, the desired freedom of movement is maintained without the need for suspending hardware or lubrication.

Referring now to FIG. 7 there is shown a second alternate structure for implementing the embodiment of FIG. 5. In this embodiment a bearing 907 is mounted in a recessed portion of reflector 702. Shaft 920, which is attached to reflector 705 is force fit and/or glued into the rotating insert 908 of bearing 907 to minimize frictional forces present and provide the greatest freedom of movement for rotating reflector 705. A ball bearing assembly or the like is employed for bearing 907. Also, shaft 920 may be constructed of a flexible material such as a flexible plastic material or a metallic shaft of spring material to allow additional relative movement of reflectors 702 and 705 such as shown by arrow 982. This technique may be used instead of or in addition to the use of spring 710. Note that the cause of the relative movement of the two reflector bodies such as 702 and 705 may be through direct physical contact with reflector 702 or transmitted through spring 710 if the assembly is so suspended or through the action of the wind or the like. The increased relative movement enhances the visibility of the reflector assembly by increasing the dynamic prismatic action described above.

I claim:

1. Reflective apparatus comprising:

first reflector means having a plurality of prismatic structures for reflecting light;

second reflector means relatively positioned in front of said first reflector means with respect to a predetermined observation point and having a plurality of prismatic structures having surfaces with reflective and transmissive characteristics for reflecting a portion of incident light striking thereon and for transmitting therethrough a portion of said incident light to strike said first reflector means; and third means for movably coupling said first and second reflector means and for allowing the relative movement of said first and second reflector means.

2. The apparatus as in claim 1 and further comprising counterweight means coupled to said second reflector means for increasing the relative movement of said second reflector means with respect to said first reflector means by creating an unbalanced condition of said second reflector means about a preselected axis of rotation.

3. The apparatus as in claim 1, wherein said third means comprises a flexible member for coupling said first and second reflector means.

4. The apparatus as in claim 2, and further comprising suspension means for suspending said first reflector means from a preselected reference point.

5. The apparatus as in claim 4, wherein said suspension means comprises a suspension member comprising an elongated piece of resilient material.

6. The apparatus as in claim 4, wherein said suspension means comprises a spring-like member.

7. The apparatus as in claim 4, wherein said suspension means comprises a first piece of fabric-like material coupled to said first reflector means for mating with a preselected second piece of corresponding fabric-like material for attaching said apparatus to a predetermined area.

8. The apparatus as in claim 1, wherein said first and second reflector means comprise different color materials.

* * * * *